(No Model.) 2 Sheets—Sheet 2.

F. WHITING.
LANTERN.

No. 508,496. Patented Nov. 14, 1893.

Witnesses
J. Ulke Jr.
N. J. Riley

Inventor
Frank Whiting,
By his Attorneys,
C. A. Snow & Co.

THE NATIONAL LITHOGRAPHING COMPANY,
WASHINGTON, D. C.

UNITED STATES PATENT OFFICE.

FRANK WHITING, OF WHITING, IOWA.

LANTERN.

SPECIFICATION forming part of Letters Patent No. 508,496, dated November 14, 1893.

Application filed December 19, 1892. Serial No. 455,640. (No model.)

*To all whom it may concern:*

Be it known that I, FRANK WHITING, a citizen of the United States, residing at Whiting, in the county of Monona and State of Iowa, have invented a new and useful Lantern, of which the following is a specification.

The invention relates to improvements in lanterns.

The object of the present invention is to improve the construction of lanterns, and to enable them to be more readily and conveniently handled.

The invention consists in the construction and novel combination and arrangement of parts hereinafter fully described, illustrated in the accompanying drawings and pointed out in the claims hereto appended.

Figure 1:
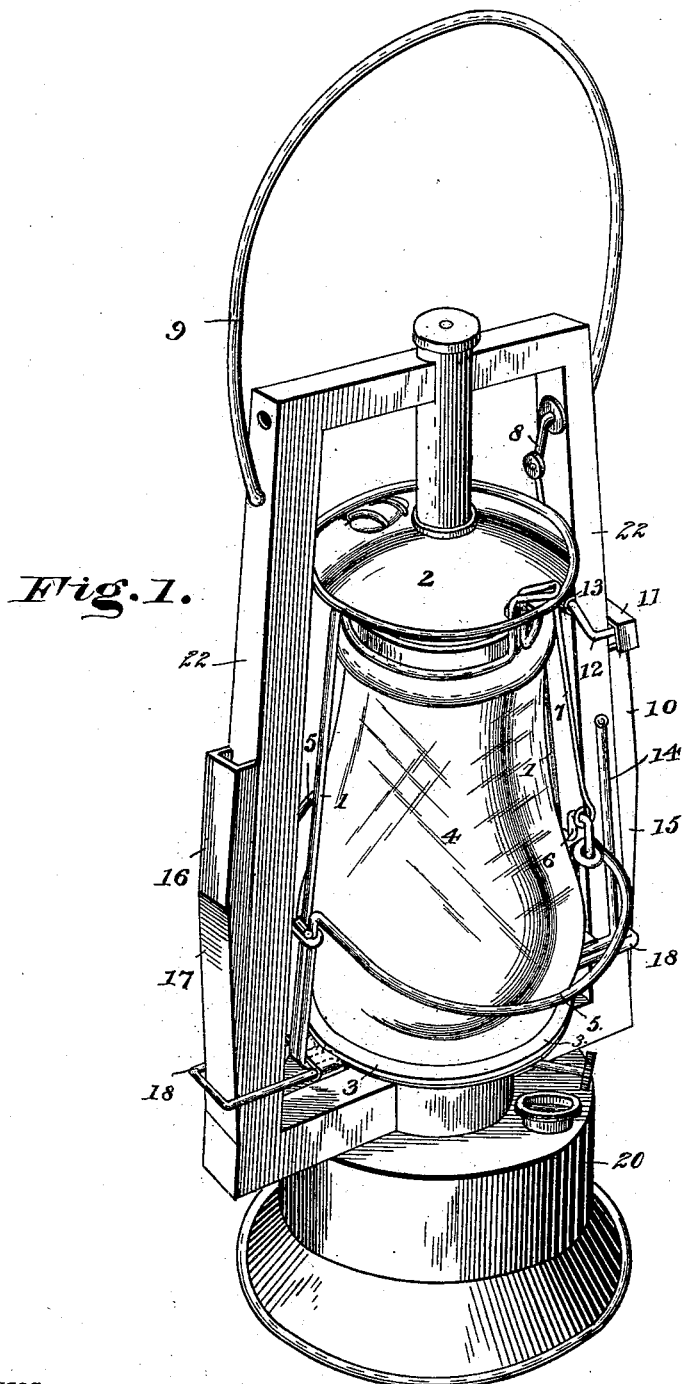
Figure 2:
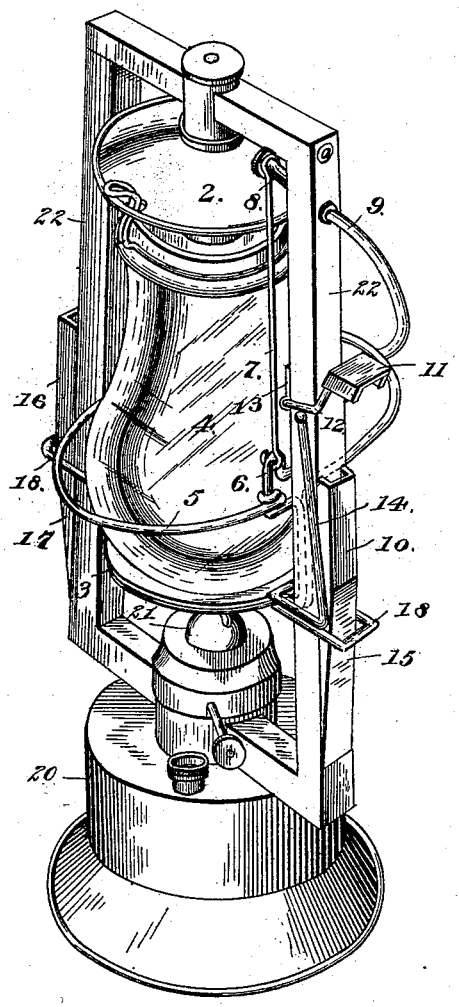
Figure 3:
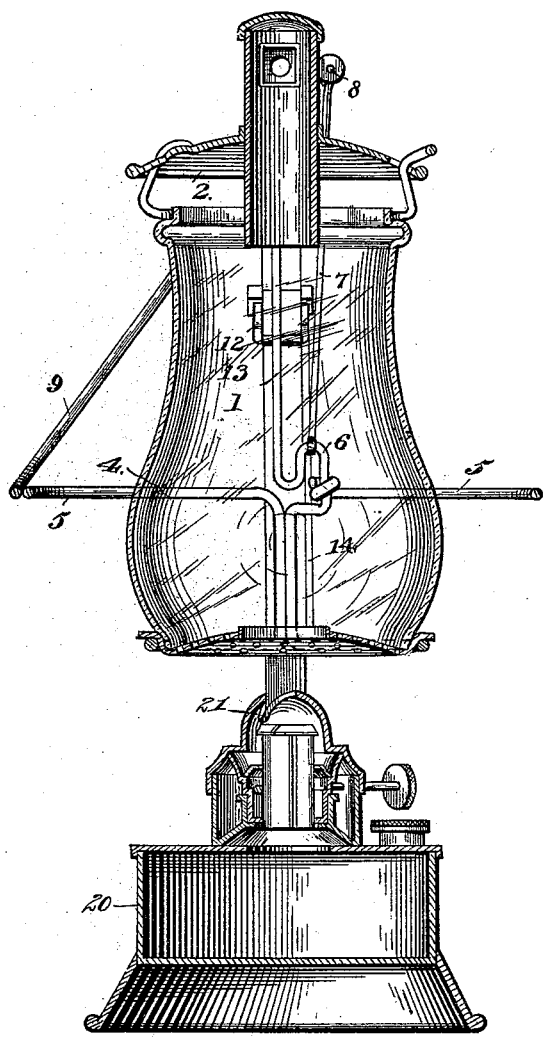

In the drawings—Figure 1 is a perspective view of a lantern constructed in accordance with this invention, the globe being down upon the burner. Fig. 2 is a similar view, the globe being elevated to afford access to the burner. Fig. 3 is a vertical sectional view, the parts being as shown in Fig. 2.

Like numerals of reference indicate corresponding parts in all the figures of the drawings.

1 designates opposite side wires of a globe holder each wire having its upper end secured to a shield 2 and extended semi-circularly at the bottom around one-half the circumference of a globe seat 3 and up the opposite side of the lantern along the side wire thereat to near the middle of a globe 4 and extending outward horizontally to form a guard wire 5. One of the side wires is provided above the guard wires with a sigmoidal bend 6 which is connected by a rod 7 with a crank extension 8 of a bail 9 which is hinged in the usual manner at the top of the lantern to the side tubes thereof. The crank 8 is arranged at the inner side of the adjacent tube and is formed by extending one end of the bail 9. This construction enables the globe holder to be readily lifted above the burner to afford access to the same for lighting, extinguishing, wick trimming, and the like; and it also serves to hold the bail elevated and out of contact with the globe to prevent the bail becoming heated. The connecting rod and the crank may be varied in length and arrangement to give the desired lift to the globe holder, and at the same time permit the bail to have a limited swing before actuating the globe holder, whereby the lantern may be carried and swung without moving the globe holder.

The lantern which has a reservoir 20 and a burner 21, is provided on the outer face of one of its side air tubes 22, with a match safe 10, which is provided with a cover 11; and the latter is hinged by a bail 12 to the adjacent air-tube. The bail 12 embraces the air-tube, and is hinged to an eye 13 at the inner side of the tube. It is provided with angular sides, and it is adapted to be engaged by a rod 14 secured to the globe holder and arranged below the bail 12 and extending along the air tube, whereby when the globe holder is lifted, the rod 14 will be carried upward on the air tube and caused to come in contact with the bail 12 and uncover the match safe. As soon as the globe holder is lowered, the cover 11 falls by gravity, and covers the match safe.

The air tubes at the sides of the lantern gradually converge, being slightly inwardly inclined, and the match-safe 10 is provided with a depending tapering extension 15 the outer edge of which is perpendicular, and at the other side of the lantern is arranged a casing 16 similar to the match-safe provided with an extension 17 which tapers and has its outer face or edge perpendicular. The globe holder is provided at its bottom with laterally extending loops 18 which embrace the air tubes, and are adapted to slide on the same and the tapering extensions 15 and 17 to cause the globe holder to move in a direct vertical line.

The globe is secured removably on the globe-seat by a ring embracing its top and carried by the shield 2.

It will be seen that the improvements herein shown and described are simple and inexpensive in construction, positive and accurate in operation, and that they greatly facilitate the care of a lantern. It will also be apparent that the improvements with very slight modification are susceptible of application to all kinds of lanterns in which the globes have vertical movement.

Changes in the form, proportion and the minor details of construction may be resorted to without departing from the principle or sacrificing any of the advantages of this invention.

What I claim is—

1. In a lantern, the combination with side tubes, of a sliding globe holder and a swinging bail serving as a handle for the lantern and having a crank extension connected with the globe holder and adapted to lift the same, substantially as described.

2. In a lantern, the combination with a reservoir burner and side tubes, of a vertically sliding globe holder guided by the side tubes, a swinging bail serving as a handle for the lantern and hinged near the upper ends of the tubes and provided with a crank extension, and a rod having one end connected with the crank extension and its other end attached to the globe holder, substantially as described.

3. In a lantern, the combination of side tubes, a vertically movable globe holder guided by said tubes, a match safe secured to one of the tubes, a cover arranged at the top of the match safe and hingedly connected with the adjacent tube, and a rod connected to the globe holder and arranged below the cover and adapted to lift the same when the globe holder is raised, substantially as described.

4. The combination with a lantern having a vertically movable globe holder and provided with inwardly inclined side tubes, of triangular extensions secured to the outer faces of the air-tubes and having their outer faces perpendicular, and laterally extending loops extending from the globe holder and receiving the air tubes and the triangular extensions, substantially as described.

5. In a lantern, the combination with a reservoir having a burner, side tubes, a shield, and a globe seat, of opposite side wires each having its upper end secured to the shield and extended at the bottom around the edge of the globe seat and up the opposite side of the lantern and bent horizontally and forming a semi-circular guard wire, one of the side wires being provided with a sigmoidal bend, a swinging bail provided with a crank extension, and a rod connecting the crank extension with the sigmoidal bend, substantially as described.

6. In a lantern, the combination with a reservoir having a burner, side tubes, a shield, and a globe seat, of opposite side wires each having its upper end secured to the shield and extended at the bottom around the edge of the globe seat and up the opposite side of the lantern and bent horizontally and forming a semi-circular guard wire, a swinging bail provided with a crank extension connected with the adjacent side wire, a match-safe arranged on one of the side tubes, a cover having a bail receiving the adjacent air tube, and hinged at the inner side of the same, and a rod connected with the side wires at the bottom and extending along the air-tube beneath the bail of said cover and adapted to lift the same, substantially as described.

In testimony that I claim the foregoing as my own I have hereto affixed my signature in the presence of two witnesses.

FRANK WHITING.

Witnesses:
E. H. WILKINS,
L. E. CHRISTIE.